Sept. 30, 1969     F. H. HUBERT     3,469,579

CATHETER NEEDLE

Filed May 5, 1967     2 Sheets-Sheet 1

INVENTOR
FRANZ HANS HUBERT
BY
ATTORNEYS

Sept. 30, 1969 F. H. HUBERT 3,469,579
CATHETER NEEDLE
Filed May 5, 1967 2 Sheets-Sheet 2
FIG. 7 FIG. 8 FIG. 9 FIG. 10
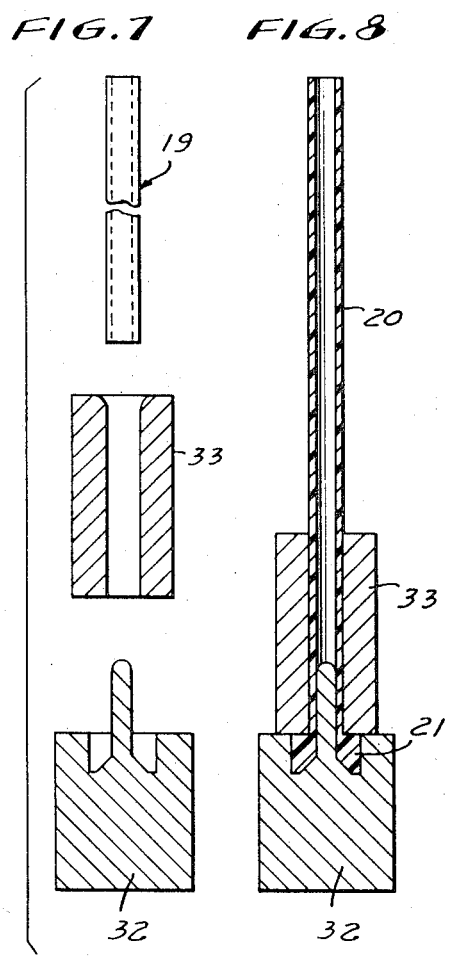
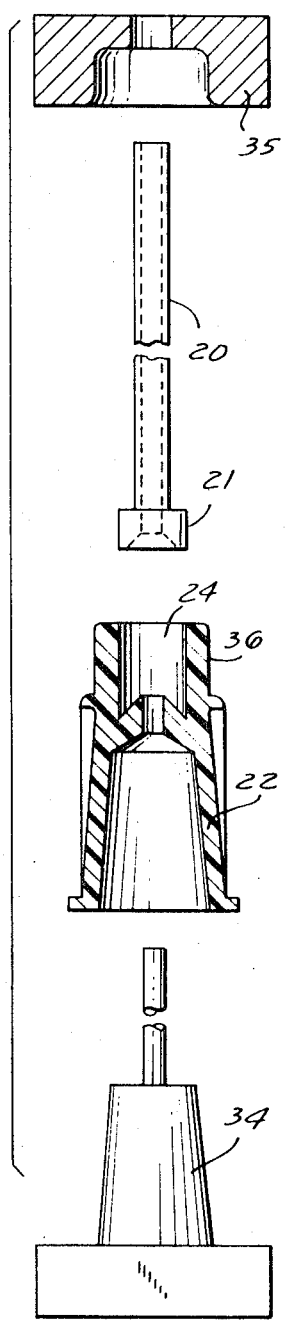
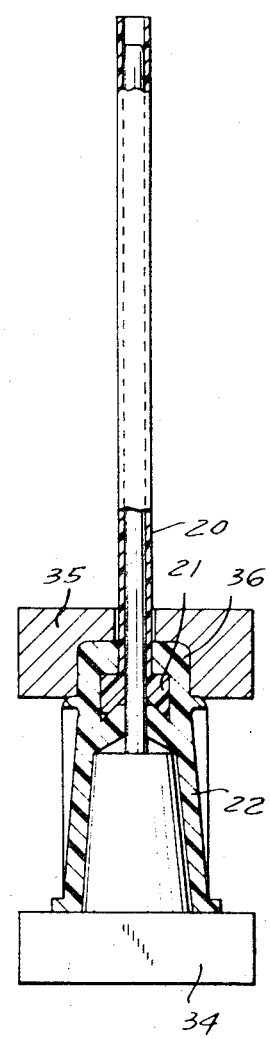
INVENTOR
FRANZ HANS HUBERT
BY
Kane, Dalsimer, Kane, Sullivan & Smith
ATTORNEYS

United States Patent Office 3,469,579
Patented Sept. 30, 1969

3,469,579
CATHETER NEEDLE
Franz Hans Hubert, Carlstadt, N.J., assignor to Becton, Dickinson and Company, Rutherford, N.J., a corporation of New Jersey
Filed May 5, 1967, Ser. No. 636,485
Int. Cl. A61m 5/32, 25/00
U.S. Cl. 128—214.4                                    3 Claims

ABSTRACT OF THE DISCLOSURE

A catheter needle having its hub and its catheter formed of different plastic materials thereby providing a plastic material for each part having the most desirable properties. Due to different melting points, heating the parts above the melting point of one plastic but below the melting point of the other allows the one plastic component to be mechanically deformed and connected to the other plastic component. When cooled, the result is a permanent, strong and leak-proof catheter needle.

BACKGROUND OF THE INVENTION

It is often desirable in the catheter art to provide a catheter needle with the catheter and the hub being composed of different materials. In this manner, advantage can be taken of the particular properties of a material which render it desirable for use as a catheter and, similarly, a different material having desirable properties for use as a hub may be employed. In particular, a more rigid and durable material is preferable for a hub while a more flexible material is preferable for the catheter portion. In this way, the catheter may be directed into any shaped passage with little danger of damage to surrounding tissue. In turn, the rigid hub provides a rigidly defined entrance way for the catheter and also provides a sturdy connecting means for a syringe or other apparatus.

However, certain problems arise when it is necessary to assemble the hub and catheter in a permanent and leak-proof manner when they are formed of different materials, particularly different plastic materials. It is difficult to provide a bonding material which will accomplish this result effectively. This is particularly true when material such as polypropylene for the hub and Teflon for the catheter are used. These two materials exhibit the desirable properties for the respective parts, however, there is no effective available bonding agent for these two materials. Therefore, a simple and effective mechanical method of connecting these components in a satisfactory manner would be a significant improvement.

SUMMARY OF THE INVENTION

To alleviate the above mentioned problems, among others, a catheter needle is provided which has a catheter portion with a head on one end which is connected to a hub having a passage therethrough and a recess adjacent its forward end which will accommodate the head of the catheter portion in a manner which permits communication of the passage of the hub and the passage through the catheter portion. The catheter and hub are formed of different materials with a permanent leak-proof connection being achieved between the parts by mechanically deforming the forward end of the hub which thereby locks the head of the catheter in the recess of the hub and forms the catheter needle.

With the above in mind, it is therefore an object of this invention to provide a catheter needle wherein the catheter portion and the hub portion are formed of different materials and are connected in a permanent leak-proof and strong manner by mechanical means.

A further object of this invention is to provide a method for connecting a catheter and a hub, which are composed of different materials, in a permanent, leak-proof and strong manner by mechanical means thereby producing an improved catheter needle.

BRIEF DESCRIPTION OF THE DRAWINGS

FIG. 7 is an exploded sectional view of a head forming apparatus for use in producing a catheter needle embodying this invention with a tube in position for having a head formed thereon.

FIG. 8 is a sectional view of a head forming apparatus for use in producing a catheter needle embodying this invention with a catheter in position after a head has been formed thereon.

FIG. 9 is an exploded sectional view of mechanical deformation apparatus for use in producing a catheter needle embodying this invention with a catheter and hub in position for assembly.

FIG. 10 is a sectional view of mechanical deformation apparatus for use in producing a catheter needle embodying this invention with a catheter and hub in position after having been assembled.

DESCRIPTION OF THE PREFERRED EMBODIMENT

Figure 6:
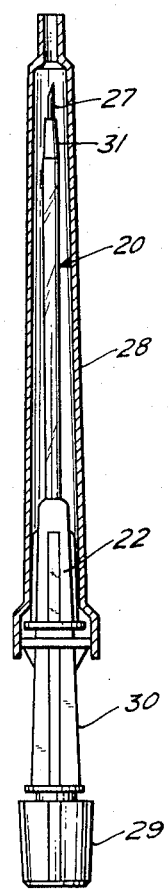
FIG. 6 is a partially sectional elevation view of a catheter needle embodying this invention connected to a needle and shield with which it may be employed.
Figure 5:
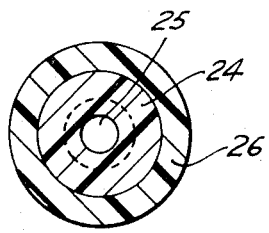
FIG. 5 is a sectional view of a catheter needle embodying this invention taken along the plane of line 5—5 of FIG. 4.

In FIG. 6, a catheter needle 10 embodying this invention is shown in a functional environment. Catheter needle 10 is bascially comprised of catheter 20 and hub 22. Catheter needle 10 is then positioned on needle 27 which extends through a continuous bore in hub 22 and catheter 20. The hub 30 of needle 27 is positioned adjacent to hub 22. A plug 29 may be then inserted in hub 30 of needle 27 to provide a stop to the passage through the entire assembly. The other open end of needle 27 is protected by a shield 28 which is mounted on hub 22 and, additionally, on hub 30. In operation, the shield 28 and plug 29 would be removed and the needle 27 and catheter 20 combination would be inserted into the body. Then, needle 27 would be removed from catheter 20 with catheter 20 remaining in the body and hub 22 providing an entrance and exit for fluids to be placed within or removed from the body. For this application, it is important that catheter 20 be formed of a material which is inert to the body thereby preventing infection and, also, which is flexible enough to conform to the passage within the body and with possible body movement thereby preventing internal damage. In turn, hub 22 should be formed of a more rigid material in order to allow a more positive connection to be made with various apparatus and also to help maintain the continuous passage and opening into the body.

Figure 1:
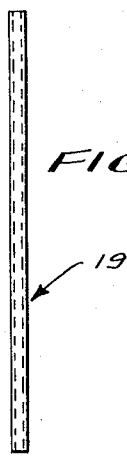
FIG. 1 is an elevation view of a tube from which the catheter is formed.
Figure 3:
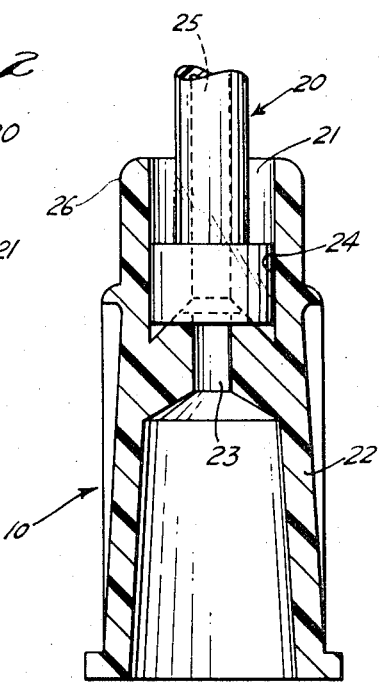
FIG. 3 is a fragmentary sectional elevation view of a catheter needle embodying this invention before the permanent connection of the parts thereof.
Figure 4:
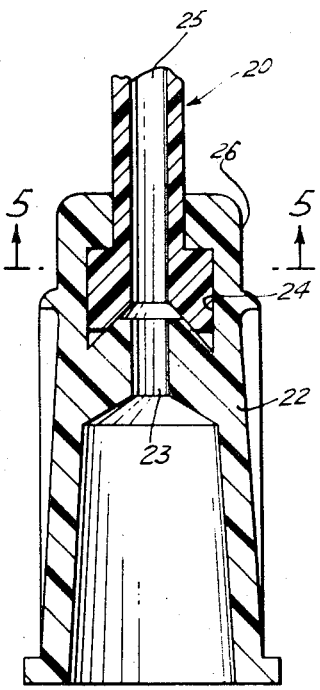
FIG. 4 is a view similar to FIG. 3 after the permanent connection between the parts has been made.

In reference to the formation of catheter 20, this can be best seen in FIGS. 1, 2, 7 and 8. As can be seen in FIGS. 1 and 7, the catheter 20 in its initial form is a length of plastic tubing 19. A material such as Teflon, vinyl and others which have the previously mentioned advantageous properties for use as a catheter may be used. For descriptive purposes in this disclosure, Teflon will be used. The significant advantages of using Teflon for a surgical catheter are pointed out in detail in the pending application Ser. No. 297,002 for a "Teflon Catheter Needle" filed on July 23, 1963.

Figure 2:
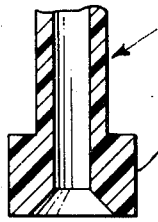
FIG. 2 is a fragmentary sectional elevation view thereof with a head having been formed on one end.

The length of plastic tubing 19 shown in FIGS. 1 and 7 which is to form catheter 20 is then subjected to a forming process whereby a head 21 is formed on one end, as can be seen in FIGS. 2 and 8. This may be accomplished in any conventional manner with conventional equipment such as passing the tubing into a heated die 32 containing a mandrel where it would be subjected to controlled heating at the end and, due to an axial movement, the end portion of the tubing would be forced back upon itself to form annular head 21 of catheter 20. Tubing 19 may be properly guided into contact with die 32 by means of a guide bushing 33. The formation of head 21 is closely controlled so that it is formed with an acceptable outer diameter for connection to a hub. The inner diameter of catheter 20 is preserved to enable a needle to be eventually passed therethrough. The particular length and inner diameter of catheter is dependent upon the specifications of the needle being used.

In FIGS. 3, 4, 9 and 10, it can be seen how catheter 20 is connected to hub 22. Any suitable thermal plastic material may be used for hub 22, however, it has to be a material with a lower melting point than the material forming catheter 20. Plastic materials such as polypropylene and polystyrene will work satisfactorily. For descriptive purposes in this disclosure, the Teflon catheter 20 will be connected to a polypropylene hub 22.

As shown there is a passage 23 extending through hub 22. An annular recess 24 is formed in the forward portion of passage 23. Recess 24 is large enough to permit the entrance of annular head 21 of catheter 20. As catheter 20 enters the hub 22, the bore 25 of the catheter 20 is aligned with opening 23 in hub 22. This provides a continuous passageway from the rear end of hub 22 to the forward tip of catheter 20 which will permit the passage of a needle or a fluid.

After head 21 is placed to its fullest extent within recess 24, the combination is subjected to controlled heating. The heating temperature is high enough to soften polypropylene hub 22 which has the lower melting point, but not to soften Teflon catheter 20 which has the higher melting point. After it has been softened, forward end 26 of hub 22 may be mechanically deformed by any suitable conventional means and apparatus such as that shown in FIGS. 9 and 10, to encompass head 21 of catheter 20 and permanently lock head 21 of catheter 20 within hub 22. Hub 22 is positioned on assembly mandrel 34. Catheter 20 is then positioned on mandrel 34 so that head 21 lies within recess 24 in hub 22 and the passages through hub 22 and catheter 20 are aligned and communicate with each other. A heated form die 35 is then brought into contact with the forward portion 36 of hub 22 so that forward portion 36 is softened and deformed to lock head 21 of catheter 20 within recess 24 of hub 22. The catheter needle combination is then cooled to maintain the parts in their fixed position. A leak-proof, permanent and strong connection is thereby formed between catheter 20 and hub 22. The passage through the resultant catheter needle 10 is not affected and remains continuous.

As shown in FIG. 6 the tip 31 of catheter needle 10 may then be tapered to facilitate the entrance of the catheter into the body as it follows the opening formed by needle 27. This taper may be accomplished by any conventional means.

Thus the aforementioned objects and advantages are most effectively attained. Although one preferred embodiment of this invention has been disclosed in detail herein, it should be understood that this invention is in no sense limited thereby; and its scope is to be determined by that of the appended claims.

I claim:
1. A catheter needle comprising; a catheter having proximal and distal ends and having a head on the proximal end thereof with an outer diameter substantially larger than the outer diameter of the remainder of the catheter, the forward radial surface of said head forming a shoulder at the point of engagement with the remainder of said catheter, said catheter having a passage therethrough, a hub having a passage therethrough and forward and rearward ends and a recess adjacent its forward end accommodating the head of said catheter so that the passage of said hub communicates with the passage of said catheter, the forward end of said hub engaging both the outer surface of the catheter and the shoulder of the head and surfaces of said hub which form a portion of said recess engaging the rear radial surface of said head thereby locking said catheter in sealing engagement with said hub, and the head of said catheter extending a predetermined longitudinal length of said catheter so as to be of sufficient thickness to alleviate the danger of deformation or fracture of said head which would permit displacement of said catheter with respect to said hub during use of said catheter needle.

2. The invention in accordance with claim 1 wherein the central portion of the rear radial surface of said head is tapered inwardly and forwardly into engagement with said bore in said catheter, and the portion of the surface of said hub which engages the tapered portion of said head having a frusto-conical configuration so as to uniformly interengage therewith and to provide an aligned communication between the passage in said hub and the passage in said catheter thereby facilitating the introduction of a needle into said catheter needle.

3. The invention in accordance with claim 1 wherein said catheter is formed of tetrapolyfluoroethylene and the hub is formed of polypropylene.

References Cited

UNITED STATES PATENTS

| 2,512,568 | 6/1950 | Saffir | 128—221 X |
| 3,055,361 | 9/1962 | Ballard | 128—214.4 |
| 3,097,646 | 7/1963 | Scislowicz | 128—214.4 |

FOREIGN PATENTS

| 1,064,445 | 12/1953 | France. |

DALTON L. TRULUCK, Primary Examiner

U.S. Cl. X.R.

128—221, 348